(12) United States Patent
Yao et al.

(10) Patent No.: US 12,117,593 B2
(45) Date of Patent: Oct. 15, 2024

(54) WIDE-ANGLE LENS INCLUDING SEVEN LENSES OF --+++−+ OR −++++−+ REFRACTIVE POWERS

(71) Applicant: Dongguan Yutong Optical Technology Co., Ltd., Dongguan (CN)

(72) Inventors: Chen Yao, Dongguan (CN); Jianwei He, Dongguan (CN); Lei Zhang, Dongguan (CN)

(73) Assignee: Dongguan Yutong Optical Technology Co., Ltd., Dongguan (CN)

( * ) Notice: Subject to any disclaimer, the term of this patent is extended or adjusted under 35 U.S.C. 154(b) by 505 days.

(21) Appl. No.: 17/458,748

(22) Filed: Aug. 27, 2021

(65) Prior Publication Data
US 2022/0066173 A1 Mar. 3, 2022

(51) Int. Cl.
*G02B 9/64* (2006.01)
*G02B 13/00* (2006.01)
*G02B 13/06* (2006.01)
*G02B 27/00* (2006.01)

(52) U.S. Cl.
CPC ........... *G02B 13/0045* (2013.01); *G02B 9/64* (2013.01); *G02B 13/06* (2013.01); *G02B 27/0025* (2013.01)

(58) Field of Classification Search
CPC ....... G02B 13/0045; G02B 9/64; G02B 13/06
See application file for complete search history.

(56) References Cited

U.S. PATENT DOCUMENTS

| | | | |
|---|---|---|---|
| 2019/0154991 A1 | 5/2019 | Kim et al. | |
| 2019/0339490 A1* | 11/2019 | Tseng | G02B 13/04 |
| 2020/0142158 A1 | 5/2020 | Yao et al. | |
| 2021/0055528 A1* | 2/2021 | Wei | G02B 9/64 |
| 2021/0255425 A1* | 8/2021 | Jiang | G02B 27/0025 |
| 2023/0185061 A1* | 6/2023 | Wang | G02B 9/62 |
| | | | 359/713 |

FOREIGN PATENT DOCUMENTS

| | | |
|---|---|---|
| TW | 201910850 A | 3/2019 |
| TW | 201947273 A1 | 12/2019 |

OTHER PUBLICATIONS

Taiwanese Office Action dated Aug. 4, 2022 for Taiwanese Patent Application No. 11120761880 (without English translation).

* cited by examiner

*Primary Examiner* — Wen Huang
(74) *Attorney, Agent, or Firm* — McCarter & English, LLP

(57) ABSTRACT

Provided a wide-angle lens includes: first lens, second lens, third lens, fourth lens, fifth lens, sixth lens, and seventh lens arranged sequentially from object surface to image surface along optic axis; first lens and sixth lens are negative focal power lenses, third lens, fourth lens, fifth lens, and seventh lens are positive focal power lenses, and second lens is negative or positive focal power lens; focal lengths of first lens, second lens, third lens, fourth lens, fifth lens, sixth lens, seventh lens, and the wide-angle lens are f1, f2, f3, f4, f5, f6, f7 and f respectively, satisfying: 0.3≤|f1/f|≤2.6, |f2/f|≥2, 2.3≤|f3/f|≤7.2, |f4/f|≥0.8, 0.67≤|f5/f|≤2.94, 0.32≤|f6/f|≤2.77, and |f7/f|≥0.16. The wide-angle lens can satisfy surveillance requirements of high definition and small distortion while ensuring low cost.

9 Claims, 14 Drawing Sheets

WIDE-ANGLE LENS INCLUDING SEVEN LENSES OF −−+++−+ OR −++++−+ REFRACTIVE POWERS

CROSS-REFERENCE TO RELATED APPLICATION(S)

This application claims priority to Chinese Patent Application No. 202010888387.4, filed Aug. 28, 2020, the disclosure of which is incorporated herein by reference in entirety.

TECHNICAL FIELD

Embodiments of the present disclosure relate to the technical field of optical devices, in particular, to a wide-angle lens.

BACKGROUND

In the period of rapid development, the security and protection industry is changing with each passing day, and especially in the field of video surveillance, it has experienced rapid development in recent years. At present, the resolution of 1080P can no longer fully satisfy the needs of the current market, while the resolution of 4K has become the future development trend. The rapid rise of the livestreaming industry in recent years has put forward more stringent requirements for lenses of high definition and intelligence. However, at present, the lenses on the market cannot simultaneously satisfy the requirements for definition, distortion, and cost, in addition, the high-definition lenses are usually accompanied with large distortion, which results in unrealistic images and high cost. Therefore, it is necessary to develop a low-cost, high-definition lens with very small distortion to solve the above problems.

SUMMARY

The present disclosure provides a wide-angle lens which can satisfy the surveillance requirements of high definition and small distortion while ensuring low cost.

The wide-angle lens provided by the embodiments of the present disclosure includes a first lens, a second lens, a third lens, a fourth lens, a fifth lens, a sixth lens, and a seventh lens which are arranged sequentially from an object surface to an image surface along an optic axis.

The first lens and the sixth lens both are negative focal power lenses, the third lens, the fourth lens, the fifth lens, and the seventh lens are all positive focal power lenses, and the second lens is a negative focal power lens or a positive focal power lens.

The focal length of the first lens is f1, the focal length of the second lens is f2, the focal length of the third lens is f3, the focal length of the fourth lens is f4, the focal length of the fifth lens is f5, the focal length of the sixth lens is f6, the focal length of the seventh lens is f7, and the focal length of the wide-angle lens is f, satisfying: $0.3 \leq |f1/f| \leq 2.6$, $|f2/f| \geq 2$, $2.3 \leq |f3/f| \leq 7.2$, $|f4/f| \geq 0.8$, $0.67 \leq |f5/f| \leq 2.94$, $0.32 \leq |f6/f| \leq 2.77$, and $|f7/f| \geq 0.16$.

Optionally, the second lens is a negative focal power lens; the third lens is a glass spherical lens, and the first lens, the second lens, the fourth lens, the fifth lens, the sixth lens, and the seventh lens are all plastic aspheric lenses; the wide-angle lens further includes a first stop disposed in an optical path between the fourth lens and the fifth lens.

Alternatively, the second lens is a positive focal power lens; the fifth lens is a glass aspheric lens, and the first lens, the second lens, the third lens, the fourth lens, the sixth lens, and the seventh lens are all plastic aspheric lenses; the wide-angle lens further includes a second stop disposed in an optical path between the third lens and the fourth lens.

Optionally, the first lens has a refractive index of n1; the second lens has a refractive index of n2 and an Abbe number of v2; the third lens has a refractive index of n3 and an Abbe number of v3; the fourth lens has a refractive index of n4 and an Abbe number of v4; and the seventh lens has a refractive index of n7, satisfying: $1.43 \leq n1 \leq 1.9$, $1.50 \leq n2 \leq 1.75$, $19 \leq v2 \leq 56$, $n3 \geq 1.43$, $v3 \geq 18.6$, $1.53 \leq n4 \leq 1.68$, $v4 \geq 19$, and $1.53 \leq n7 \leq 1.67$.

Optionally, a sag of the object-side surface of the first lens is SAG11, and a sag of the image-side surface of the first lens is SAG12, satisfying: $0.08 \leq |SAG11/SAG12| \leq 1.5$.

Optionally, a curvature radius of the object-side surface of the second lens is R21, satisfying: $|R21| \geq 1.42$.

Optionally, a central thickness of the fourth lens is CT4, and a central thickness of the fifth lens is CT5, satisfying: $|CT4/CT5| \leq 1.88$.

Optionally, a curvature radius of the object-side surface of the fifth lens is R51, and a curvature radius of the image-side surface of the fifth lens is R52, satisfying: $|R51/R52| \geq 2.23$.

Optionally, the fourth lens is a meniscus lens.

Optionally, a distance from an optic axis center of the image-side surface of the seventh lens to the image surface is BFL, and a distance from an optic axis center of the object-side surface of the first lens to the image surface is TTL, satisfying: $0.11 \leq BFL/TTL \leq 0.89$.

Optionally, the wide-angle lens has an aperture of F, satisfying: $0.6 \leq f/F \leq 2.8$.

For the wide-angle lens provided by the embodiments of the present disclosure, by reasonably setting a number of lenses in the wide-angle lens, optical focal powers of lenses in the wide-angle lens, and a relative relationship between focal lengths of lenses in the wide-angle lens, on a premise of low cost, a balance between incident angles of front lenses of the wide-angle lens and incident angles of rear lenses of the wide-angle lens is guaranteed, sensitivity of the lens is reduced, and an aberration of a large aperture is corrected, thereby guaranteeing a high resolution of the wide-angle lens and satisfying surveillance requirements of high definition and small distortion.

DETAILED DESCRIPTION

Figure 1:
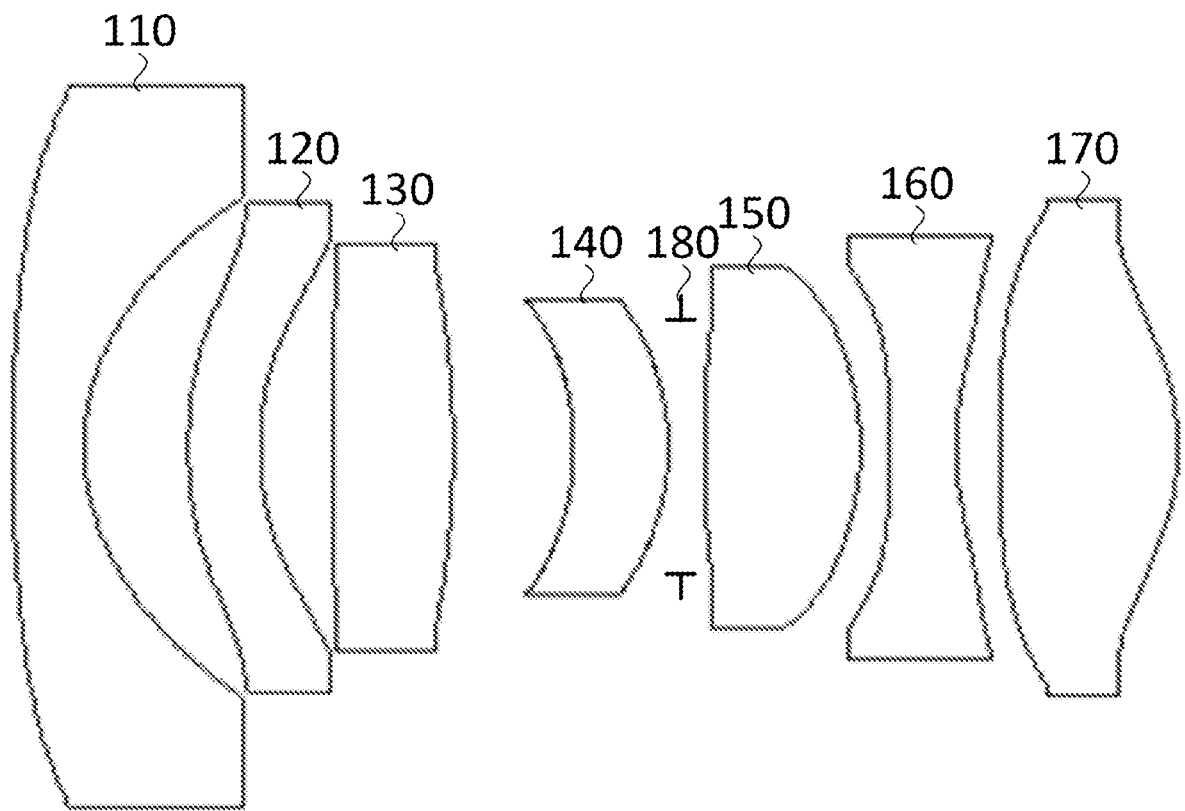
FIG. 1 is a structural view of a wide-angle lens according to an embodiment of the present disclosure.

The present disclosure is further described below in detail in conjunction with drawings and embodiments. It is to be understood that the embodiments described herein are merely intended to explain the present disclosure but not to limit the present disclosure. Additionally, it is to be noted that for ease of description, merely part, not all, of the structures related to the present disclosure are illustrated in the drawings.

FIG. 1 is a structural view of a wide-angle lens according to an embodiment of the present disclosure. As shown in FIG. 1, the wide-angle lens provided by the embodiment of the present disclosure includes a first lens 110, a second lens 120, a third lens 130, a fourth lens 140, a fifth lens 150, a sixth lens 160, and a seventh lens 170 which are arranged sequentially from an object surface to an image surface along an optic axis. The first lens 110 and the sixth lens 160 both are negative focal power lenses, the third lens 130, the fourth lens 140, the fifth lens 150, and the seventh lens 170 are all positive focal power lenses, and the second lens 120 is a negative focal power lens or a positive focal power lens. The focal length of the first lens 110 is f1, the focal length of the second lens 120 is f2, the focal length of the third lens 130 is f3, the focal length of the fourth lens 140 is f4, the focal length of the fifth lens 150 is f5, the focal length of the sixth lens 160 is f6, the focal length of the seventh lens 170 is f7, and the focal length of the wide-angle lens is f, satisfying: 0.3≤|f1/f|≤2.6, |f2/f|≥2, 2.3≤|f3/f|≤7.2, |f4/f|≥0.8, 0.67≤|f5/f|≤2.94, 0.32≤|f6/f|≤2.77, and |f7/f|≥0.16.

For example, the optical focal power is equal to a difference between the image-side beam convergence and the object-side beam convergence, which characterizes the ability of an optical system to light. The greater the absolute value of the optical focal power, the stronger the ability to deflect light, and the smaller the absolute value of the optical focal power, the weaker the ability to deflect light. In a case where the optical focal power is positive, the deflection to light is convergent; and in a case where the optical focal power is negative, the deflection to light is divergent. The optical focal power may be suitable for characterizing a certain refractive surface of a lens (that is, one surface of the lens), characterizing a certain lens, or characterizing a system formed by multiple lenses (that is, a lens group). In the wide-angle lens provided by the embodiment of the present disclosure, each lens may be fixed in a lens barrel (not shown in FIG. 1), and meanwhile, the first lens 110 is set to be a negative focal power lens and used for controlling the light incident angle of the optical system, the second lens 120 is a negative focal power lens or a positive focal power lens, the third lens 130 and the fourth lens 140 both are positive focal power lenses and used for focusing front light beams, the fifth lens 150 is a positive focal power lens, the sixth lens 160 is a negative focal power lens, and the seventh lens 170 is a positive focal power lens, in which, the fifth lens 150, the sixth lens 160, and the seventh lens 170 are used for correcting off-axis aberrations, including aberrations such as field curvature, coma, and astigmatism. The lenses as a whole guarantee an approximate proportional distribution of the optical focal powers of the optical system, and guarantee a balance between incident angles of front lenses and incident angles of rear lenses, so as to reduce sensitivity of the lenses and improve the production feasibility.

Further, the focal length f1 of the first lens 110, the focal length f2 of the second lens 120, the focal length f3 of the third lens 130, the focal length f4 of the fourth lens 140, the focal length f5 of the fifth lens 150, the focal length f6 of the sixth lens 160, the focal length f7 of the seventh lens 170, and the focal length f of the wide-angle lens are set to satisfy the following conditions: 0.3≤|f1/f|≤2.6, |f2/f|≥2, 2.3≤|f3/f|≤7.2, |f4/f|≥0.8, 0.67≤|f5/f|≤2.94, 0.32≤|f6/f|≤2.77, and |f7/f|≥0.16. The reasonable distribution of the focal length of each lens facilitates the aberration correction of the large aperture and guarantees the high resolution of the lens. For the wide-angle lens provided by the embodiments of the present disclosure, by reasonably setting a number of lenses in the wide-angle lens, optical focal powers of lenses in the wide-angle lens, and a relative relationship between focal lengths of lenses in the wide-angle lens, on a premise of low cost, a balance between incident angles of front lenses of the wide-angle lens and incident angles of rear lenses of the wide-angle lens is guaranteed, sensitivity of the lens is reduced, and an aberration of a large aperture is corrected, thereby guaranteeing a high resolution of the wide-angle lens and satisfying surveillance requirements of high definition and small distortion.

With continued reference to FIG. 1, optionally, the second lens 120 is a negative focal power lens; the third lens 130 is a glass spherical lens, and the first lens 110, the second lens 120, the fourth lens 140, the fifth lens 150, the sixth lens 160, and the seventh lens 170 are all plastic aspheric lenses; the wide-angle lens further includes a first stop 180 disposed in an optical path between the fourth lens 140 and the fifth lens 150.

The second lens 120 is a negative focal power lens and used for correcting the off-axis aberration. The third lens 130 is a glass spherical lens, while the first lens 110, the second lens 120, the fourth lens 140, the fifth lens 150, the sixth lens 160, and the seventh lens 170 are all plastic aspheric lenses which serve to correct all aberrations of high-order. Since the cost of the lens made of plastic material is much lower than the cost of the lens made of glass material, the wide-angle lens provided by the embodiment of the present disclosure is provided with six plastic aspheric lenses and thus has good image quality and low cost. Since the two kinds of materials compensate for each other, the wide-angle lens can still be used normally in high and low temperature environment. By disposing the first stop 180 in the optical path between the fourth lens 140 and the fifth lens 150, the propagation direction of the light beam can be adjusted, and the incident angle of the light beam can be adjusted, which facilitates the improvement of the imaging quality.

Figure 2:
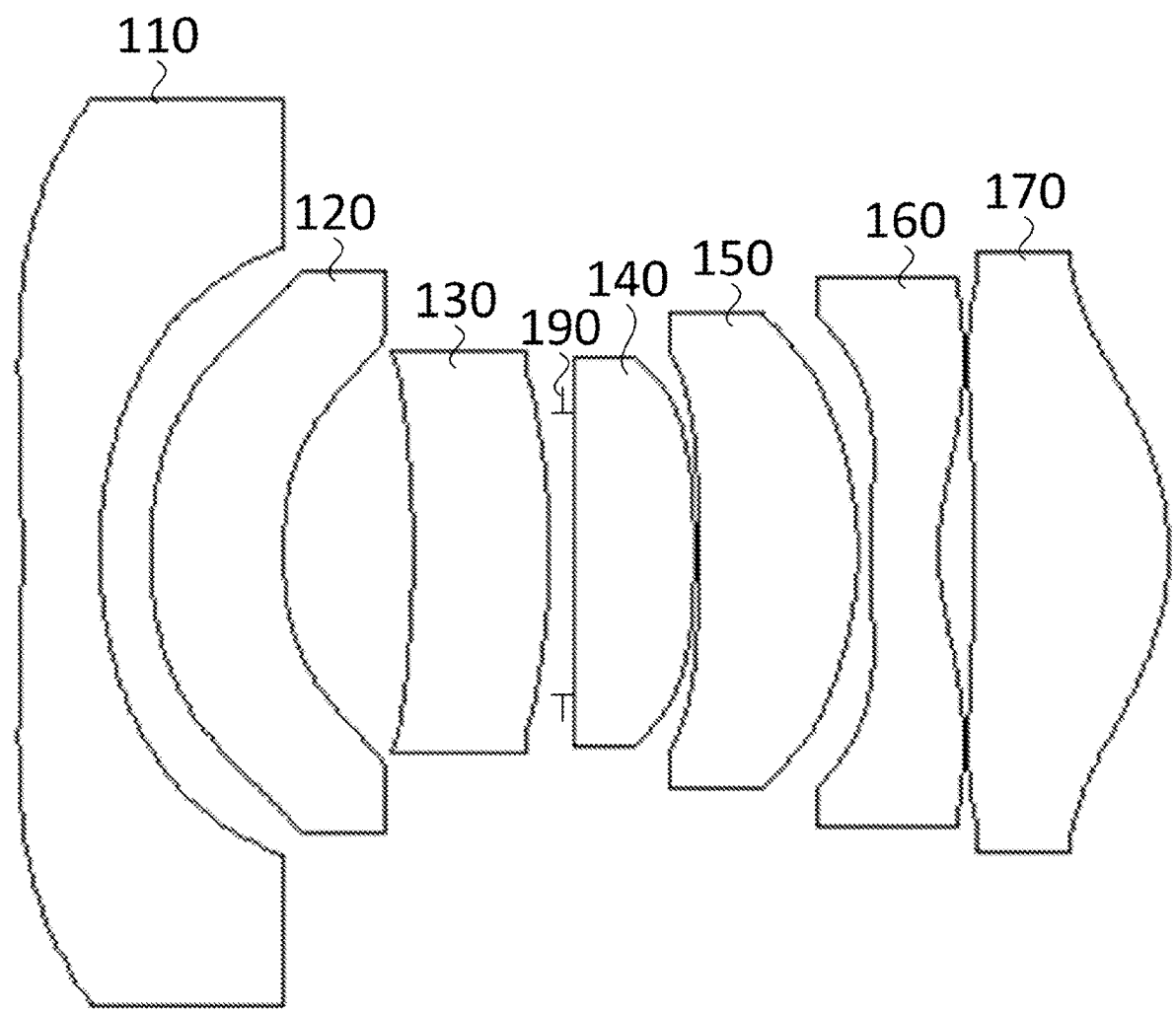
FIG. 2 is a structural view of a wide-angle lens according to another embodiment of the present disclosure.

In other embodiments, the second lens 120 may also be a positive focal power lens. For example, FIG. 2 is a structural view of a wide-angle lens according to another embodiment of the present disclosure. As shown in FIG. 2, the fifth lens 150 is a glass aspheric lens, and the first lens 110, the second lens 120, the third lens 130, the fourth lens 140, the sixth lens 160, and the seventh lens 170 are all plastic aspheric lenses; the wide-angle lens further includes a second stop 190 disposed in an optical path between the third lens 130 and the fourth lens 140.

The fifth lens 150 is a glass aspheric lens, and the first lens 110, the second lens 120, the third lens 130, the fourth lens 140, the sixth lens 160, and the seventh lens 170 are all plastic aspheric lenses which serve to correct all high-order aberrations. Since the cost of the lens made of plastic material is much lower than the cost of the lens made of glass material, the wide-angle lens provided by the embodiment of the present disclosure is provided with six plastic aspheric lenses and thus has good image quality and low cost. Since the two kinds of materials compensate for each other, the wide-angle lens can still be used normally in high and low temperature environment. By disposing the second stop 190 in the optical path between the third lens 130 and the fourth lens 140, the propagation direction of the light beam can be adjusted, and the incident angle of the light beam can be adjusted, which facilitates the improvement of the imaging quality.

It is to be noted that the materials of the above-mentioned plastic aspheric lens can be various plastics known to those skilled in the art, and the materials of the glass spherical lens can be various types of glass known to those skilled in the art, which are not described in detail or limited in the embodiments of the present disclosure.

Optionally, the first lens 110 has a refractive index of n1; the second lens 120 has a refractive index of n2 and an Abbe number of v2; the third lens 130 has a refractive index of n3 and an Abbe number of v3; the fourth lens 140 has a refractive index of n4 and an Abbe number of v4; and the seventh lens 170 has a refractive index of n7, satisfying: $1.43 \leq n1 \leq 1.9$, $1.50 \leq n2 \leq 1.75$, $19 \leq v2 \leq 56$, $n3 \geq 1.43$, $v3 \geq 18.6$, $1.53 \leq n4 \leq 1.68$, $v4 \geq 19$, and $1.53 \leq n7 \leq 1.67$.

The refractive index is a ratio of a propagation speed of light in vacuum to a propagation speed of light in medium, which is mainly used to describe an ability of a material to refract light, and different materials have different refractive indices. The Abbe number is an index used to represent a dispersion ability of a transparent medium. The greater the dispersion of the medium, the smaller the Abbe number; and on the contrary, the smaller the dispersion of the medium, the larger the Abbe number. Therefore, by setting the refractive index and Abbe number of each lens in the wide-angle lens, a balance between incident angles of front lenses of the wide-angle lens and incident angles of rear lenses of the wide-angle lens is guaranteed, so as to reduce sensitivity of the lens and facilitate to achieve higher pixel resolution.

Optionally, the sag of the object-side surface of the first lens 110 is SAG11, and the sag of the image-side surface of the first lens 110 is SAG12, satisfying: $0.08 \leq |SAG11/SAG12| \leq 1.5$.

The sag represents a longitudinal distance from the highest point to the lowest point on the lens surface, and the sag SAG11 of the object-side surface of the first lens and the sag SAG12 of the image-side surface of the first lens are set to satisfy the following condition: $0.08 \leq |SAG11/SAG12| \leq 1.5$, which facilitate the reasonable control of the light incident angle of the optical system.

Optionally, the curvature radius of the object-side surface of the second lens 120 is R21, satisfying: $|R21| \geq 1.42$.

The curvature radius is in units of millimeter (mm). The curvature radius R21 of the object-side surface of the second lens 120 is set to satisfy the following condition: $|R21| \geq 1.42$, which facilitates shortening of a total length of the optical path and guarantees reducing of the overall volume of the lens.

Optionally, the central thickness of the fourth lens 140 is CT4, and the central thickness of the fifth lens 150 is CT5, satisfying: $|CT4/CT5| \leq 1.88$.

The central thickness CT4 of the fourth lens 140 and the central thickness CT5 of the fifth lens 150 are set to satisfy the following condition: $|CT4/CT5| \leq 1.88$, which reasonably controls the aperture of the wide-angle lens and facilitates the aberrations correction.

Optionally, the curvature radius of the object-side surface of the fifth lens 150 is R51, and the curvature radius of the image-side surface of the fifth lens 150 is R52, satisfying: $|R51/R52| \geq 2.23$.

The curvature radius R51 of the object-side surface of the fifth lens 150 and the curvature radius R52 of the image-side surface of the fifth lens 150 are set to satisfy the following condition: $|R51/R52| \geq 2.23$, which makes the object-side surface of the fifth lens 150 relatively flat and facilitates the improvement of the imaging quality.

Optionally, the fourth lens 140 is a meniscus lens.

The meniscus lens is composed of two spherical surfaces with small curvature radiuses whose numerical difference is relatively small, and the fourth lens is set as a meniscus lens, which facilitates the correction of the field curvature.

Optionally, a distance from an optic axis center of the image-side surface of the seventh lens 170 to the image surface is BFL, and a distance from an optic axis center of the object-side surface of the first lens 110 to the image surface is TTL, satisfying: $0.11 \leq BFL/TTL \leq 0.89$.

The distance from the optic axis center of the image-side surface of the seventh lens 170 to the image surface may be understood as the back focus of the wide-angle lens, and the distance from the optic axis center of the object-side surface of the first lens 110 to the image surface may be understood as the back focus of the wide-angle lens may be understood as the total track length of the wide-angle lens. The reasonable setting of the relationship between the back focus of the wide-angle lens and the total track length of the wide-angle lens can guarantee both a compact structure and a high integration of the whole wide-angle lens.

As a feasible implementation, in the wide-angle lens provide by the embodiment of the present disclosure, the aperture F and the focal length f satisfy the following condition: $0.6 \leq f/F \leq 2.8$, which satisfies the surveillance requirements of high definition and small distortion in the case of large aperture.

For the wide-angle lens provided by the embodiments of the present disclosure, by reasonably distributing the optical focal power, surface type, Abbe number, and center thickness of each lens, on the premise of low cost, the balance between incident angles of front lenses of the wide-angle lens and incident angles of rear lenses of the wide-angle lens is guaranteed, and the sensitivity of the lens is reduced, and the aberration of the large aperture is corrected, thereby guaranteeing the high resolution of the wide-angle lens and satisfying the surveillance requirements of high definition and small distortion.

Specific embodiments of an optical imaging lens group applicable to the above-described embodiments are further described below with reference to the drawings.

Embodiment One

With continued reference to FIG. 1, the wide-angle lens provided by Embodiment one of the present disclosure includes a first lens 110, a second lens 120, a third lens 130, a fourth lens 140, a fifth lens 150, a sixth lens 160, and a seventh lens 170 which are arranged sequentially from an object surface to an image surface along an optic axis, where a first stop 180 is disposed in an optical path between the fourth lens 140 and the fifth lens 150. Table 1 shows optical physical parameters such as surface type, curvature radius, thickness, and material of each lens in the wide-angle lens provided by Embodiment one.

TABLE 1

Optical physical parameters of the wide-angle lens

| Surface No. | Surface type | Curvature radius | thickness | Material (nd) | K coefficient |
|---|---|---|---|---|---|
| 1 | Aspheric | 15.6 | 0.6 | 1.53 | −93.9 |
| 2 | Aspheric | 2.4 | 0.9 | | −0.4 |
| 3 | Aspheric | 4.6 | 0.6 | 1.67 | 1.4 |
| 4 | Aspheric | 3.6 | 0.6 | | −2.9 |
| 5 | Spherical | 60.7 | 1.1 | 2.0 | |
| 6 | Spherical | −10.7 | 1.1 | | |
| 7 | Aspheric | −3.1 | 0.8 | 1.66 | −0.4 |
| 8 | Aspheric | −2.7 | 0.1 | | −1.2 |
| STO | PL | Infinity | 0.2 | | |
| 10 | Aspheric | 15.5 | 1.4 | 1.53 | −0.4 |
| 11 | Aspheric | −2.8 | 0.2 | | −9.4 |
| 12 | Aspheric | −43.8 | 0.6 | 1.67 | 123.8 |
| 13 | Aspheric | 2.7 | 0.4 | | −9.4 |
| 14 | Aspheric | 22.3 | 1.6 | 1.53 | 69.4 |
| 15 | Aspheric | −2.6 | 2.6 | | −1.1 |

The surface numbers are numbered according to the surface order of each lens. For example, the surfaces with surface Nos. 1 and 2 are the object-side surface and the image-side surface of the first lens 110, respectively, the surfaces with surface Nos. 3 and 4 are the object-side surface and the image-side surface of the second lens 120, respectively, and the others likewise. The curvature radius represents a bending degree of the lens surface, among which the positive value of the curvature radius represents the surface bent towards the image-side surface, and the negative value of the curvature radius represents the surface bent towards the object-side surface. The thickness represents the central axial distance from a current surface to a next surface. The curvature radius and the thickness are in units of millimeter (mm).

On the basis of the above-mentioned embodiment, optionally, the third lens 130 is a glass spherical lens, and the first lens 110, the second lens 120, the fourth lens 140, the fifth lens 150, the sixth lens 160, and the seventh lens 170 are all plastic aspheric lenses. The wide-range lens provided by the embodiment of the present disclosure further includes a first stop 180, and with the addition of the first stop 180, the propagation direction of the light beam can be adjusted, which facilitates the improvement of the imaging quality.

The first stop 180 may be located in the optical path between the fourth lens 140 and the fifth lens 150, but the specific location of the first stop 180 is not limited by the embodiments of the present disclosure.

The aspheric surface shape equation Z of the first lens 110, the second lens 120, the third lens 130, the fourth lens 140, the fifth lens 150, the sixth lens 160, and the seventh lens 170 satisfies:

$$Z = \frac{cy^2}{1 + \sqrt{1 - (1+k)c^2 y^2}} + Ay^4 + By^6 + Cy^8 + Dy^{10} + Ey^{12} + Fy^{14}.$$

In the equation, Z is the sag of a distance along the optic axis from the aspheric surface located at a position with a height of y to the vertex of the aspheric surface; c=1/R where R represents the paraxial curvature radius of the lens surface; K is a cone coefficient, and A, B, C, D, E, and F are aspheric coefficients of high-order. Z, R, and Y are all in units of mm.

For example, the aspheric coefficients of each lens in Embodiment one in a feasible implementation are described in detail in Table 2.

TABLE 2

Aspheric coefficients of the wide-angle lens

| No. | A | B | C | D | E | F | G |
|---|---|---|---|---|---|---|---|
| 1 | 4.45E−04 | 1.31E−04 | 1.43E−06 | −5.85E−07 | −2.17E−08 | 7.04E−09 | −3.11E−10 |
| 2 | −6.92E−03 | 3.18E−04 | 1.94E−04 | −4.02E−05 | −3.18E−06 | 2.01E−06 | −1.79E−07 |
| 3 | 9.64E−03 | −1.50E−03 | −3.27E−04 | −9.29E−05 | 7.15E−06 | 4.77E−06 | −4.97E−07 |
| 4 | 2.58E−02 | 1.84E−04 | −2.83E−03 | 3.60E−04 | −1.39E−05 | 1.56E−05 | −2.36E−06 |
| 7 | −1.15E−02 | 3.07E−03 | −5.66E−03 | 9.49E−04 | 1.09E−03 | −1.86E−04 | −6.18E−05 |
| 8 | −1.55E−05 | −7.59E−03 | 1.16E−03 | 3.05E−04 | 7.41E−05 | −1.12E−05 | −1.41E−05 |
| 10 | 2.00E−02 | −1.46E−02 | 4.41E−03 | −8.45E−04 | 8.14E−05 | −1.14E−04 | 3.19E−05 |
| 11 | −1.01E−02 | −7.97E−03 | 3.37E−03 | −1.50E−03 | 2.52E−04 | −5.64E−06 | −1.05E−06 |
| 12 | −3.98E−02 | −6.14E−04 | 3.79E−03 | −1.50E−03 | 2.14E−04 | −3.21E−06 | 1.07E−06 |
| 13 | −2.54E−02 | 6.06E−03 | −4.51E−04 | −1.71E−06 | −3.97E−06 | 8.71E−07 | 1.24E−08 |
| 14 | 7.76E−03 | 2.96E−04 | −2.18E−05 | 7.11E−06 | −1.67E−06 | −4.68E−07 | 6.56E−08 |
| 15 | 9.56E−03 | 8.13E−04 | 2.84E−04 | −3.12E−05 | −1.94E−06 | 2.09E−07 | −6.92E−09 |

4.45E-04 represents that the coefficient A of the surface with surface No. 1 is $4.45*10^{-3}$, and the others likewise.

The wide-angle lens of Embodiment one reaches the following technical indexes:
- entrance pupil diameter: N=1.48;
- aperture: F=2.0;
- TTL/BFL=3.54;
- field angle: 2w≥95°;
- optical distortion: F-Tan (Theta)≤3%; and
- resolution: adaptable to a CCD or a CMOS camera with a high-resolution of 8 megapixel.

Figure 3:
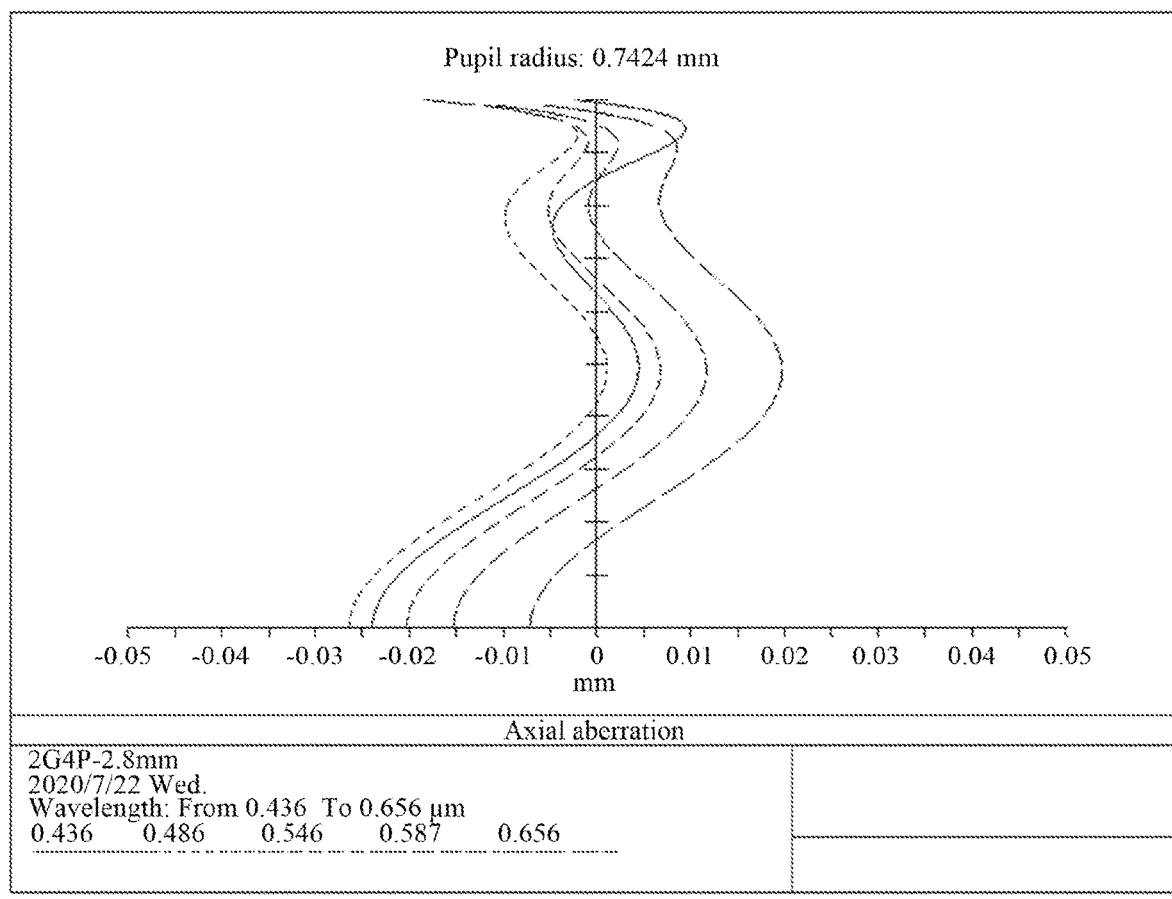
FIG. 3 is a spherical aberration curve plot of a wide-angle lens according to Embodiment one of the present disclosure.

Further, FIG. 3 is a spherical aberration curve plot of a wide-angle lens according to Embodiment one of the present disclosure. As shown in FIG. 3, the spherical aberration of the wide-angle lens at different wavelengths (0.436 μm, 0.486 μm, 0.546 μm, 0.587 μm, and 0.656 μm) is within 0.05 mm, and the curves at different wavelengths are relatively concentrated, which indicates that the axial aberration of the wide-angle lens is very small. Therefore, it can be seen that the wide-angle lens provided by the embodiment of the present disclosure can better correct the aberration.

Figure 4:
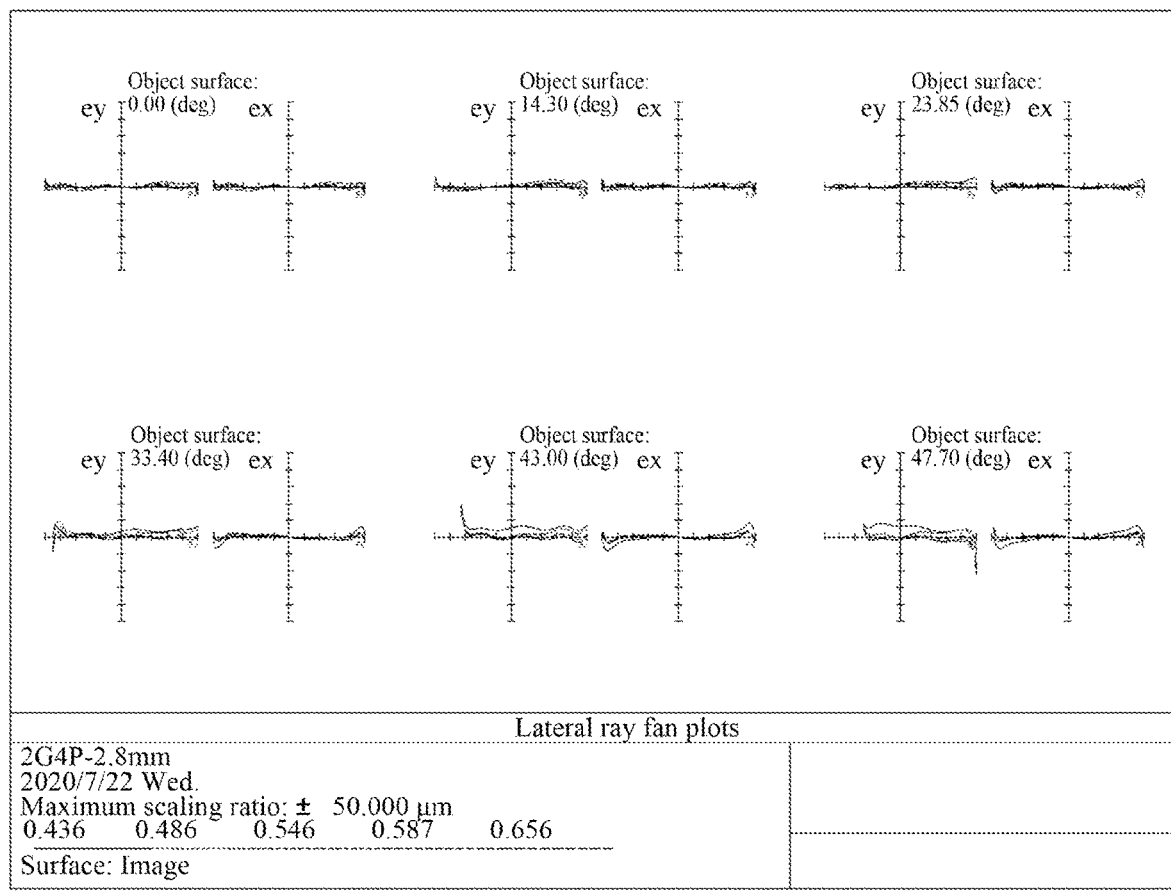
FIG. 4 are ray fan plots of a wide-angle lens according to Embodiment one of the present disclosure.

FIG. 4 are ray fan plots of a wide-angle lens according to Embodiment one of the present disclosure. As shown in FIG. 4, the imaging ranges of rays of different wavelengths (0.436 μm, 0.486 μm, 0.546 μm, 0.588 μm, and 0.656 μm) under different field angles of the wide-angle lens are all within 50 μm, and the curves are very concentrated, which ensures that the aberration in different field of view areas is small, that is, the wide-angle lens corrects the aberration of the optical system better.

Figure 5:
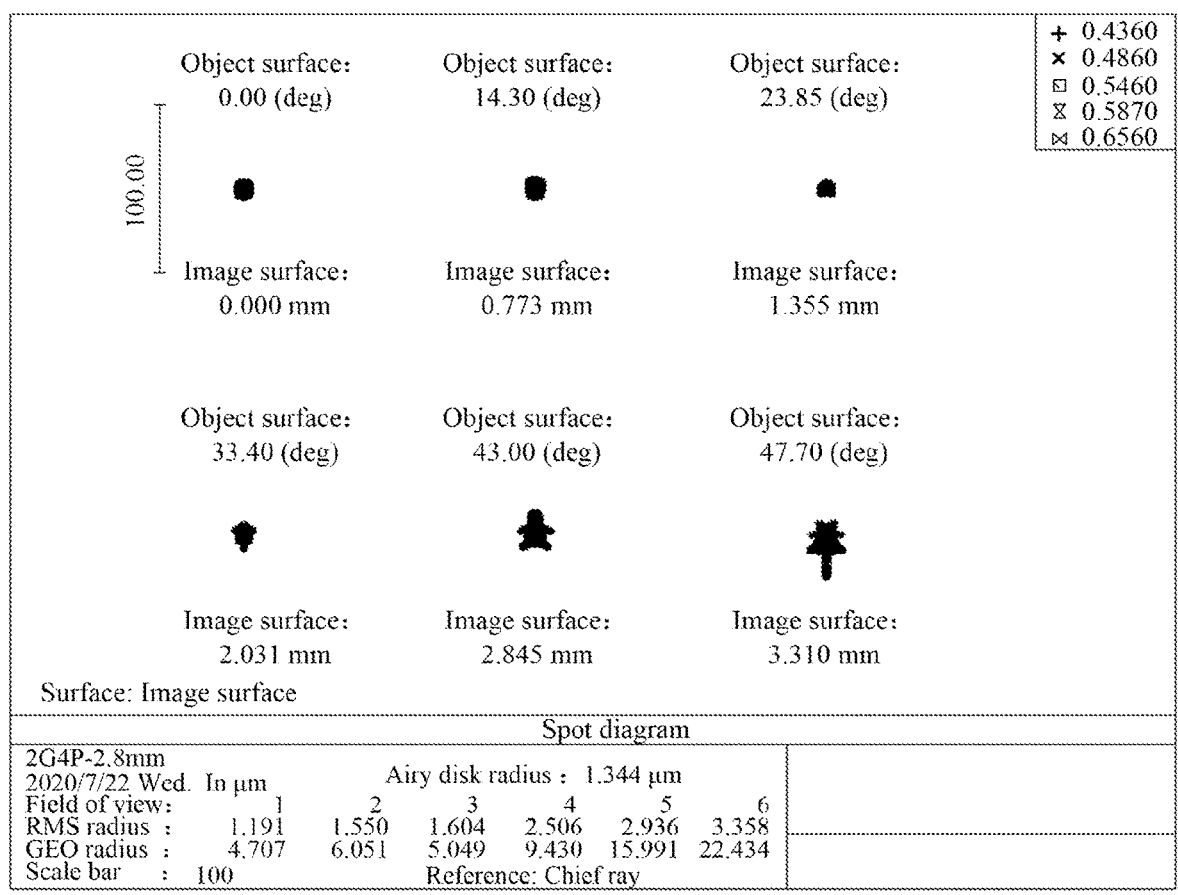
FIG. 5 is a spot diagram of a wide-angle lens according to Embodiment one of the present disclosure.

FIG. 5 is a spot diagram of a wide-angle lens according to Embodiment one of the present disclosure. As shown in FIG. 5, the RMS radius of each field of view is less than 3.5 μm, which indicates that the wide-angle lens provided by Embodiment one has high image quality.

Figure 6:
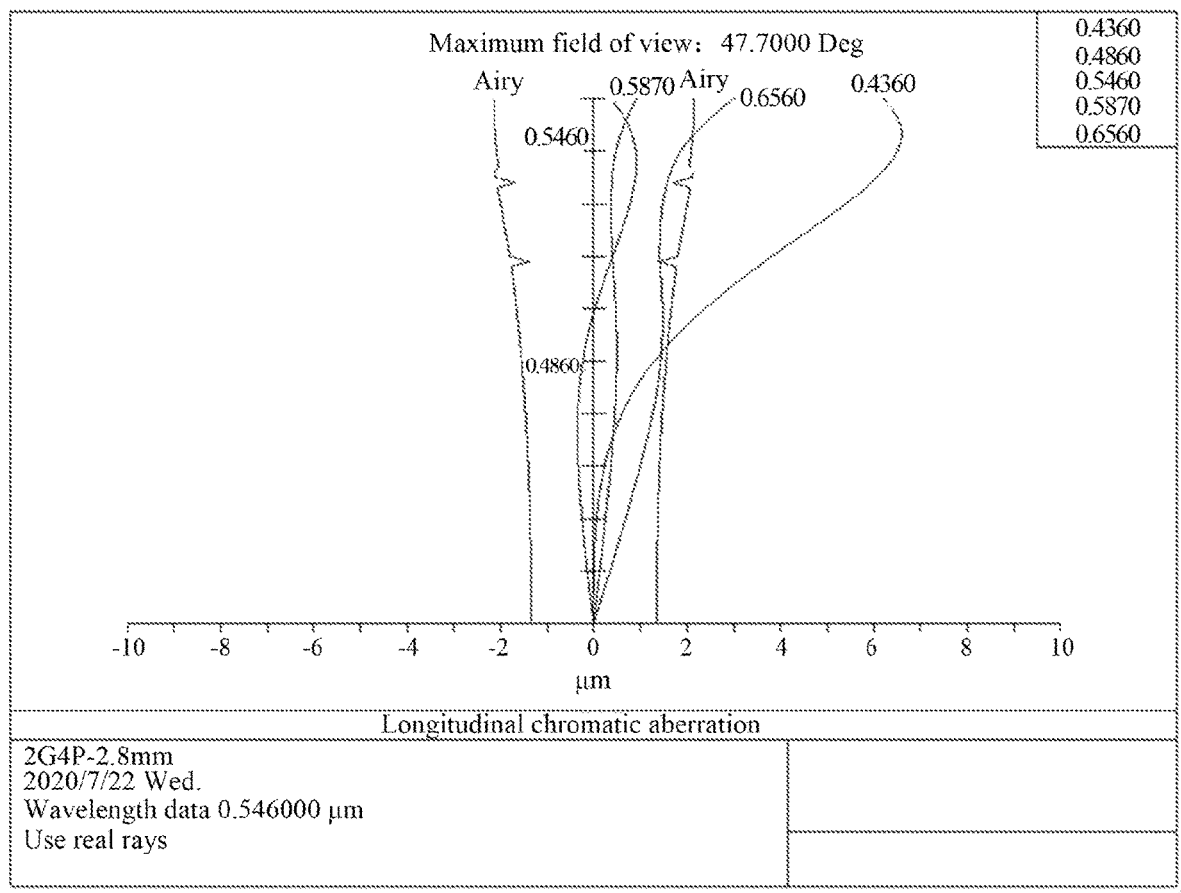
FIG. 6 is a longitudinal chromatic aberration graph of a wide-angle lens according to Embodiment one of the present disclosure.
Figure 7:
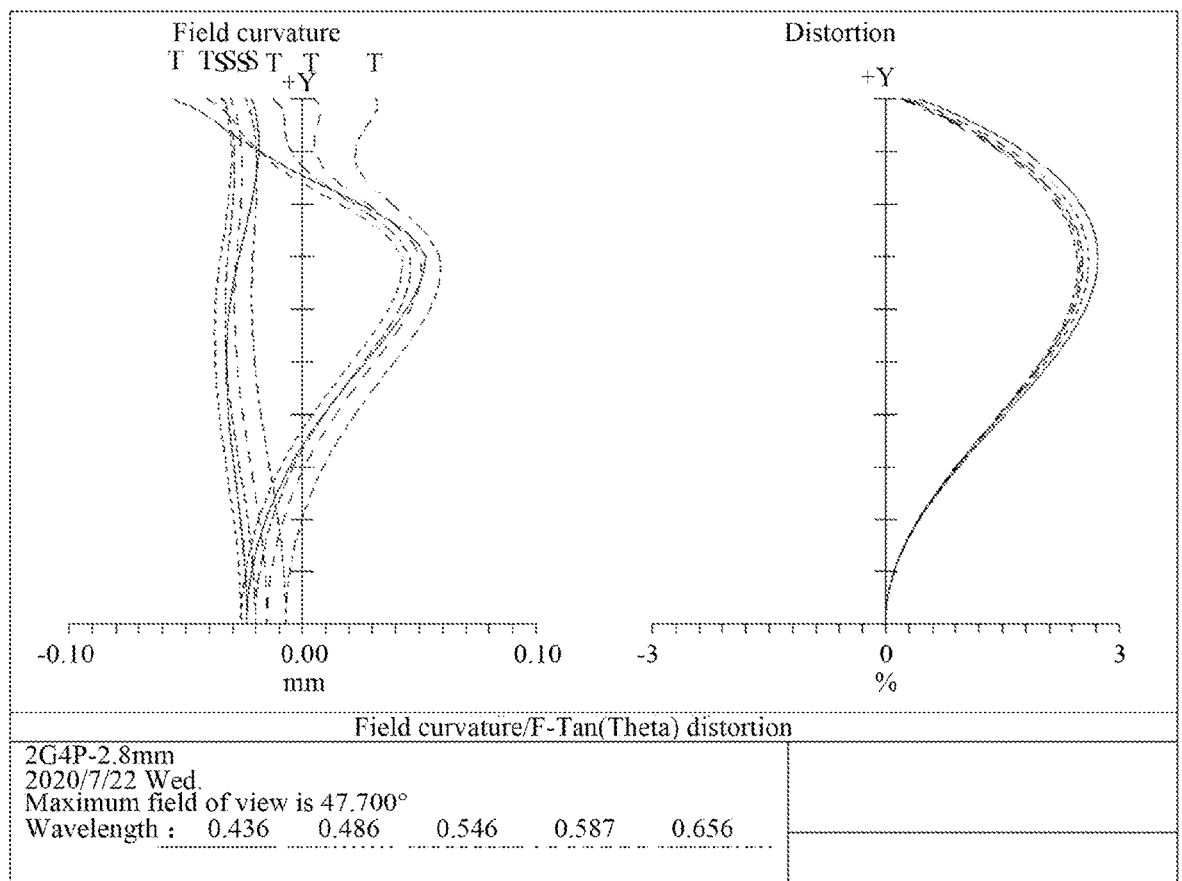
FIG. 7 are field curvature and distortion plots of a wide-angle lens according to Embodiment one of the present disclosure.
Figure 8:
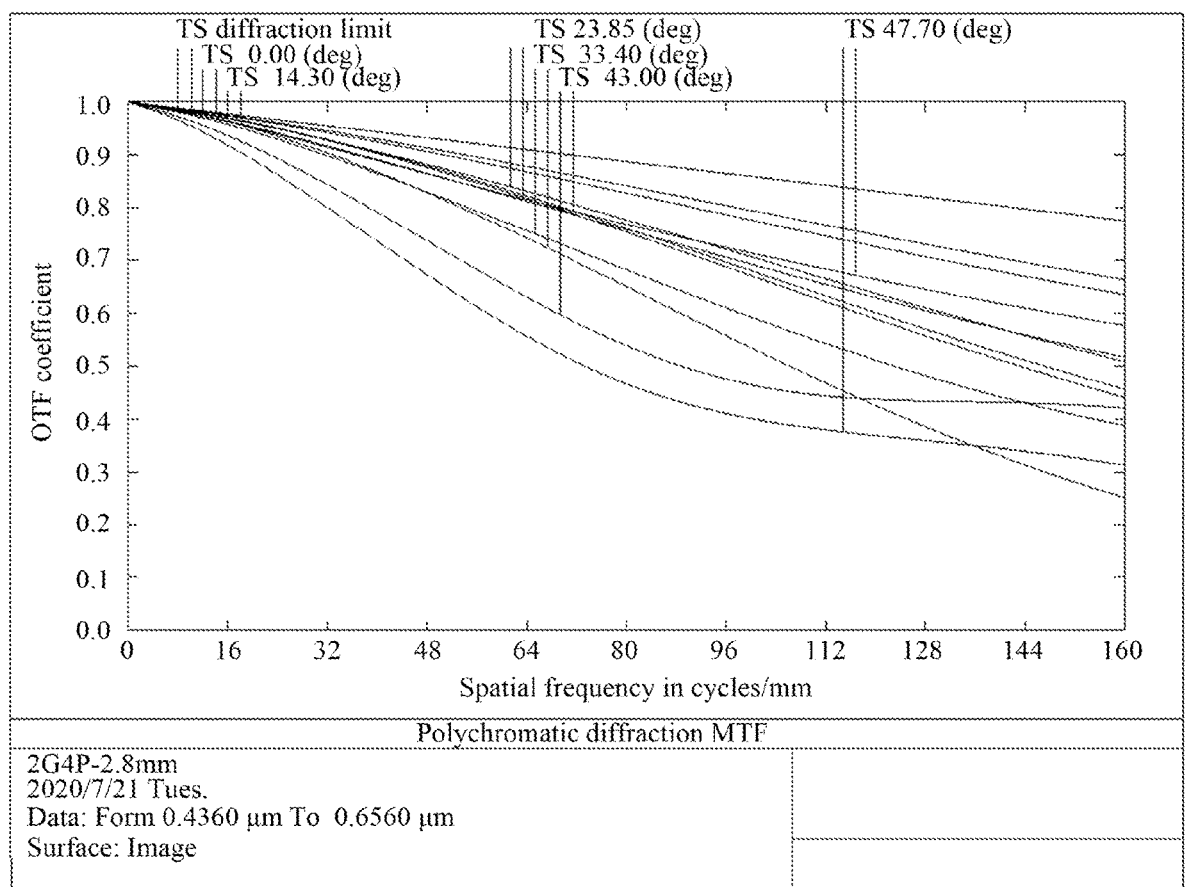
FIG. 8 is an MTF chart of a wide-angle lens according to Embodiment one of the present disclosure.

FIG. 6 is a longitudinal chromatic aberration graph of a wide-angle lens according to Embodiment one of the present disclosure. FIG. 7 are field curvature and distortion plots of a wide-angle lens according to Embodiment one of the present disclosure. FIG. 8 is a modulation transfer function (MTF) chart of a wide-angle lens according to Embodiment one of the present disclosure. As shown in FIGS. 6, 7, and 8, the longitudinal chromatic aberration of the wide-angle lens provided by the embodiment of the present disclosure is small; the field curvature is small, that is, when imaging, the difference between the image quality of the center and the image quality of the periphery is small; and the image quality is high, so that the 4K high-definition image quality can be achieved.

Embodiment Two

With continued reference to FIG. 2, the wide-angle lens provided by Embodiment two of the present disclosure includes a first lens 110, a second lens 120, a third lens 130, a fourth lens 140, a fifth lens 150, a sixth lens 160, and a seventh lens 170 which are arranged sequentially from an object surface to an image surface along an optic axis, where a second stop 190 is disposed in an optical path between the third lens 130 and the fourth lens 140. Table 3 shows optical physical parameters such as surface type, curvature radius, thickness, and material of each lens in the wide-angle lens provided by Embodiment two.

TABLE 3

Optical physical parameters of the wide-angle lens

| Surface No. | Surface type | Curvature radius | Thickness | Material (nd) | K coefficient |
|---|---|---|---|---|---|
| 1 | Aspheric | −20.9 | 0.6 | 1.53 | −172.5 |
| 2 | Aspheric | 3.6 | 0.4 | | 0.16 |
| 3 | Aspheric | 3.4 | 1.1 | 1.66 | 0.9 |
| 4 | Aspheric | 3.1 | 1.0 | | 1.1 |
| 5 | Aspheric | −8.1 | 1.1 | 1.66 | −0.0023 |
| 6 | Aspheric | −5.1 | 0.2 | | −38.4 |
| STO | PL | Infinity | 0.03 | | |
| 8 | Aspheric | 34.4 | 0.9 | 1.53 | −0.2 |
| 9 | Aspheric | −8.5 | 0.04 | | −0.00036 |
| 10 | Spherical | −9.3 | 1.3 | 1.69 | 10.9 |
| 11 | Spherical | −2.6 | 0.1 | | −6.8 |
| 12 | Aspheric | 5.4 | 0.5 | 1.67 | −49.3 |
| 13 | Aspheric | 2.0 | 0.3 | | −8.3 |
| 14 | Aspheric | −13.5 | 1.6 | 1.53 | 30.4 |
| 15 | Aspheric | −2.2 | 2.8 | | −0.8 |

The surface numbers are numbered according to the surface order of each lens. For example, the surfaces with surface Nos. 1 and 2 are the object-side surface and the image-side surface of the first lens 110, respectively, the surfaces of surface Nos. 3 and 4 are the object-side surface and the image-side surface of the second lens 120, respectively, and the others likewise. The curvature radius represents the bending degree of the lens surface, among which the positive value of the curvature radius represents the surface bent towards the image-side surface, and the negative value of the curvature radius represents the surface bent towards the object-side surface. The thickness represents the central axial distance from a current surface to a next surface. The curvature radius and the thickness are in units of millimeter (mm).

On the basis of the above-mentioned embodiment, optionally, the fifth lens 150 is a glass aspheric lens, and the first lens 110, the second lens 120, the fourth lens 140, the fifth lens 150, the sixth lens 160, and the seventh lens 170 are all plastic aspheric lenses. The wide-range lens provided by the embodiment of the present disclosure further includes a second stop 190 (STO), and with the addition of the second stop 190, the propagation direction of the light beam can be adjusted, which facilitates the improvement of the imaging quality. The second stop 190 may be located in the optical path between the third lens 130 and the fourth lens 140, but the specific location of the second stop 190 is not limited by the embodiments of the present disclosure.

The aspheric surface shape equation Z of the first lens 110, the second lens 120, the third lens 130, the fourth lens 140, the fifth lens 150, the sixth lens 160, and the seventh lens 170 satisfies:

$$Z = \frac{cy^2}{1+\sqrt{1-(1+k)c^2y^2}} + Ay^4 + By^6 + Cy^8 + Dy^{10} + Ey^{12} + Fy^{14}.$$

In the equation, Z is the sag of a distance along the optic axis from the aspheric surface located at a position with a height of y to the vertex of the aspheric surface; c=1/R, where R represents the paraxial curvature radius of the lens surface; K is a cone coefficient; and A, B, C, D, E, and F are aspheric coefficients of high-order. Z, R, and Y are all in units of mm.

For example, the aspheric coefficients of each lens in Embodiment two in a feasible implementation are described in detail in Table 4.

TABLE 4

Aspheric coefficients of the wide-angle lens

| No. | A | B | C | D | E | F | G |
|---|---|---|---|---|---|---|---|
| 1 | 2.84E−03 | 1.86E−04 | −3.62E−06 | −9.37E−07 | 3.80E−08 | 1.85E−10 | 2.84E−03 |
| 2 | 3.37E−03 | −1.11E−03 | 1.67E−04 | 4.18E−05 | 1.02E−06 | −5.31E−07 | 3.37E−03 |
| 3 | 2.38E−02 | −2.66E−03 | −1.85E−04 | 1.76E−05 | 6.01E−06 | −2.31E−06 | 2.38E−02 |
| 4 | 5.48E−02 | 3.66E−03 | −4.36E−03 | −2.51E−04 | −1.15E−04 | 5.38E−05 | 5.48E−02 |
| 5 | 1.68E−02 | −7.79E−03 | 7.59E−04 | −1.14E−05 | −1.42E−05 | 1.20E−06 | 1.68E−02 |
| 6 | −1.11E−02 | 3.84E−03 | 6.94E−04 | −1.46E−03 | 2.85E−04 | −1.77E−05 | −1.11E−02 |
| 8 | −7.28E−03 | −2.57E−04 | −7.32E−03 | 5.76E−03 | −2.44E−03 | 0.00E+00 | −7.28E−03 |
| 9 | −3.22E−02 | −1.57E−03 | −5.18E−04 | −1.34E−03 | 2.82E−04 | 0.00E+00 | −3.22E−02 |
| 10 | 1.73E−02 | −1.36E−02 | 3.46E−03 | −1.75E−03 | 9.94E−05 | 9.34E−05 | 1.73E−02 |
| 11 | 1.44E−03 | −8.72E−03 | 2.82E−03 | −1.33E−03 | 2.65E−04 | −1.38E−05 | 1.44E−03 |
| 12 | −4.69E−02 | −4.85E−03 | 4.65E−03 | −1.48E−03 | 1.68E−04 | 3.39E−06 | −4.69E−02 |
| 13 | −3.87E−02 | 6.39E−03 | −4.92E−04 | 8.19E−06 | −9.41E−07 | 4.58E−07 | −3.87E−02 |
| 14 | 6.54E−03 | 7.56E−04 | −3.29E−05 | 2.20E−05 | −4.75E−06 | 5.16E−07 | 6.54E−03 |
| 15 | 7.37E−03 | 1.17E−04 | 4.63E−04 | 4.75E−06 | −1.32E−05 | 9.34E−07 | 7.37E−03 |

2.84E-03 represents that the coefficient A of the surface with surface No. 1 is 2.84*10$^{-3}$, and the others likewise.

The wide-angle lens of Embodiment two reaches the following technical indexes:

entrance pupil diameter: N=1.5;
aperture: F=2.0;
TTL/BFL=3.17;
field angle: 2w≥95°;
optical distortion: F-Tan (Theta)≤3%; and
resolution: adaptable to a CCD or a CMOS camera with high-resolution of 8 megapixel.

Figure 9:
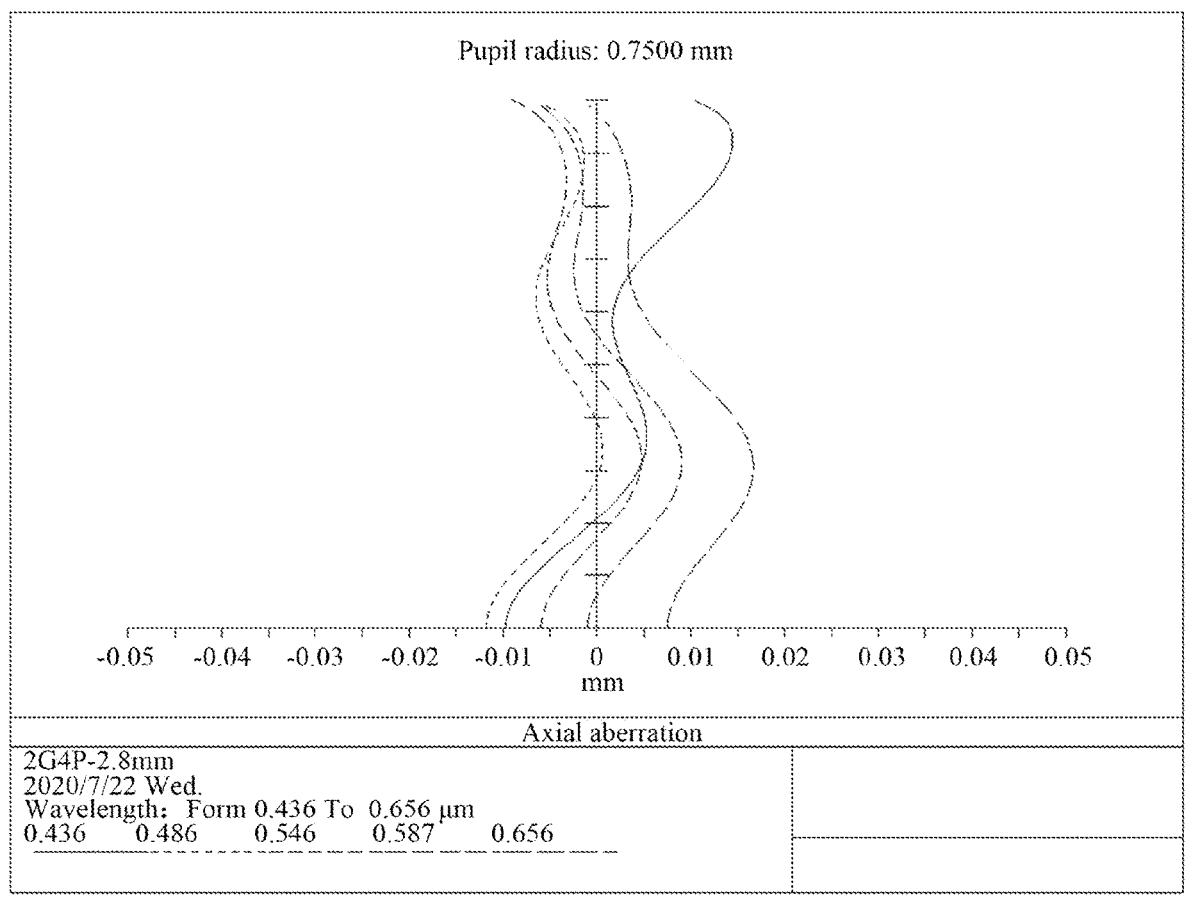
FIG. 9 is a spherical aberration curve plot of a wide-angle lens according to Embodiment two of the present disclosure.

Further, FIG. 9 is a spherical aberration curve plot of a wide-angle lens according to Embodiment two of the present disclosure. As shown in FIG. 9, the spherical aberration of the wide-angle lens at different wavelengths (0.436 µm, 0.486 µm, 0.546 µm, 0.587 µm, and 0.656 µm) is within 0.05 mm, and the curves at different wavelengths are relatively concentrated, which indicates that the axial aberration of the wide-angle lens is very small. Therefore, it can be seen that the wide-angle lens provided by the embodiment of the present disclosure can better correct the aberration.

Figure 10:
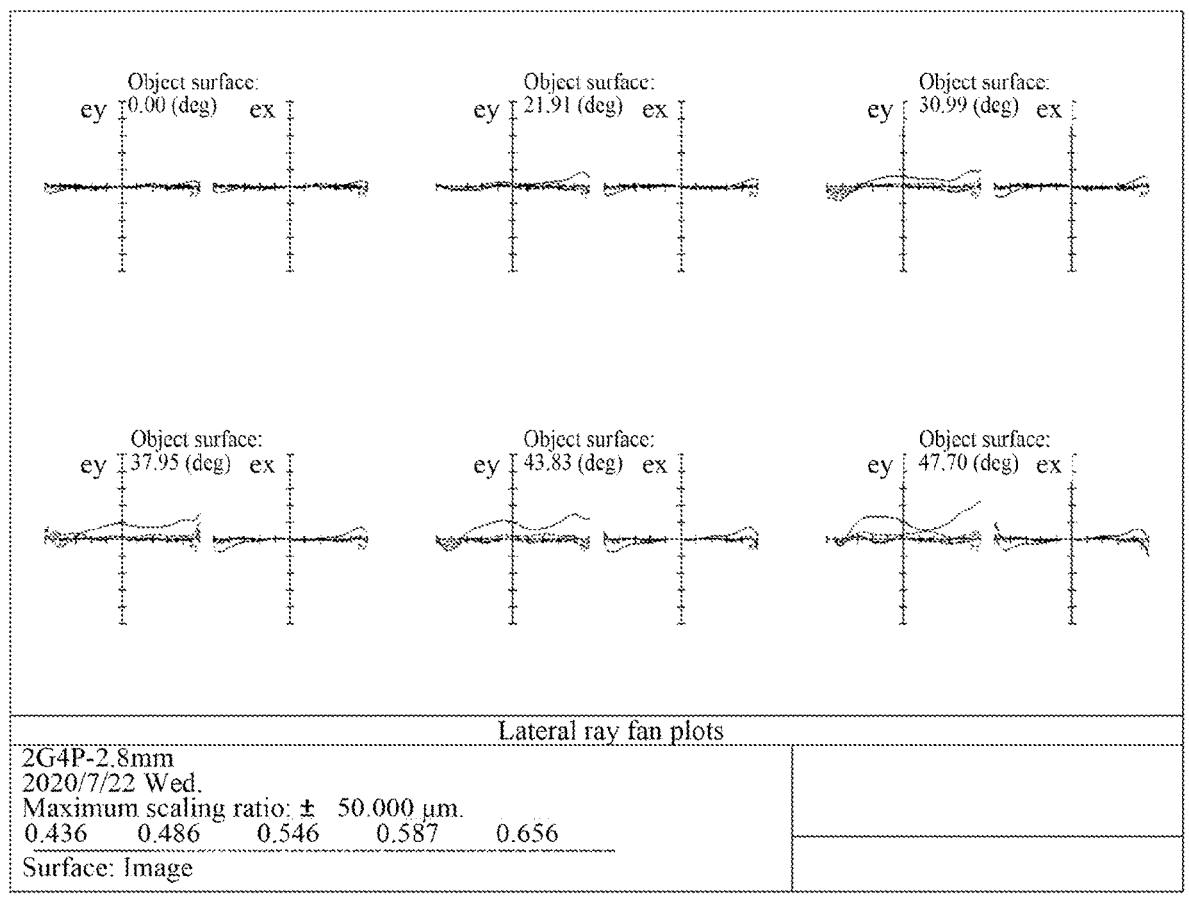
FIG. 10 are ray fan plots of a wide-angle lens according to Embodiment two of the present disclosure.

FIG. 10 are ray fan plots of a wide-angle lens according to Embodiment two of the present disclosure. As shown in FIG. 10, the imaging ranges of rays of different wavelengths (0.436 µm, 0.486 µm, 0.546 µm, 0.588 µm, and 0.656 µm) under different field angles of the wide-angle lens are all within 50 µm, and the curves are very concentrated, which ensures that the aberration in different field of view areas is small, that is, the wide-angle lens corrects the aberration of the optical system better.

Figure 11:
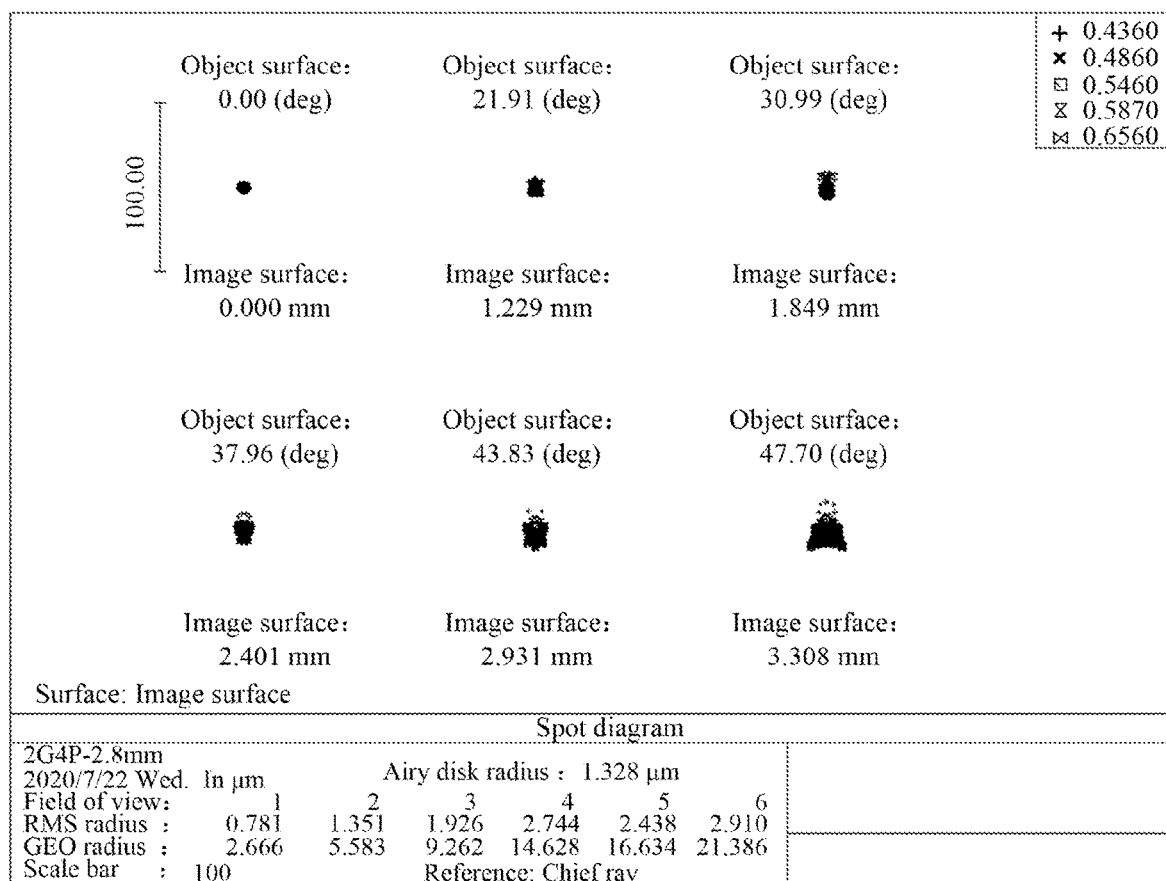
FIG. 11 is a spot diagram of a wide-angle lens according to Embodiment two of the present disclosure.

FIG. 11 is a spot diagram of a wide-angle lens according to Embodiment two of the present disclosure. As shown in FIG. 11, the root mean square (RMS) radius of each field of view is less than 3.5 µm, which indicates that the wide-angle lens provided by Embodiment two has high image quality.

Figure 12:
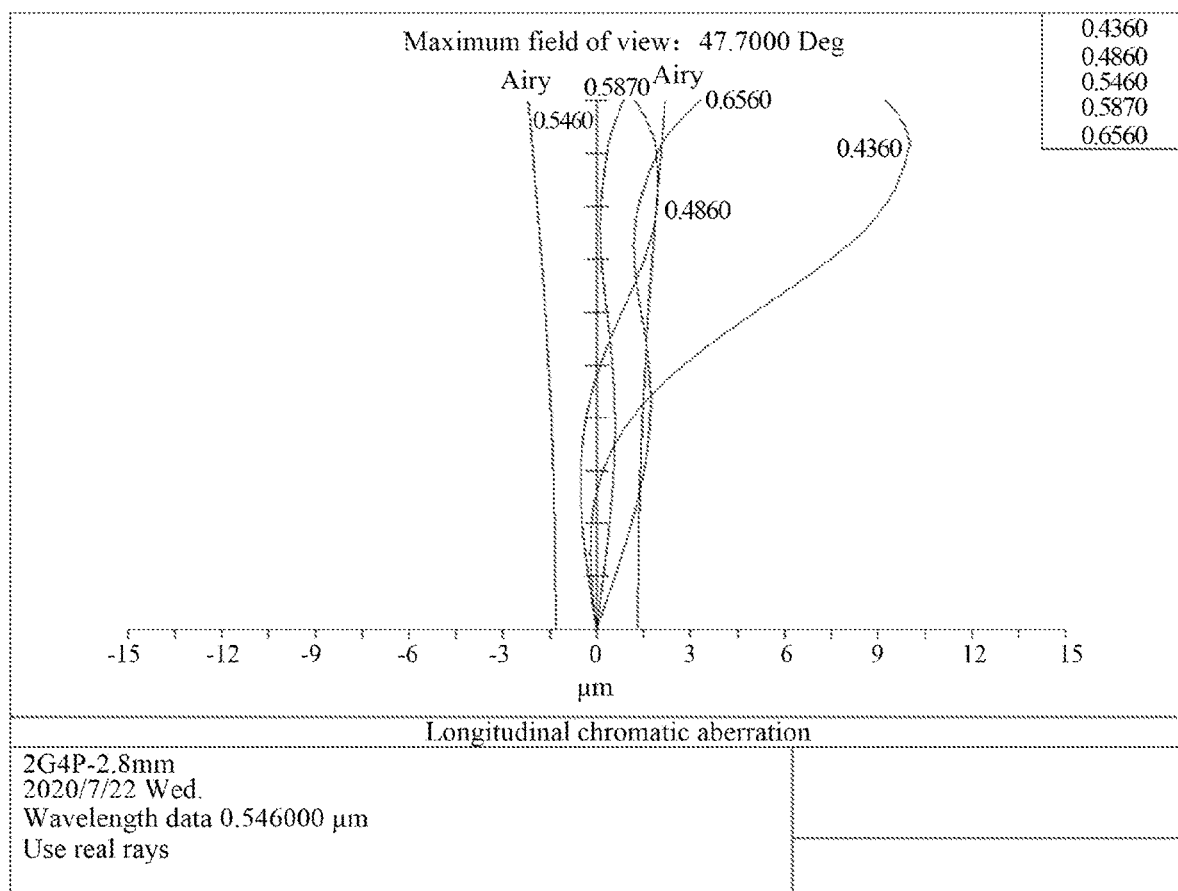
FIG. 12 is a longitudinal chromatic aberration graph of a wide-angle lens according to Embodiment two of the present disclosure.
Figure 13:
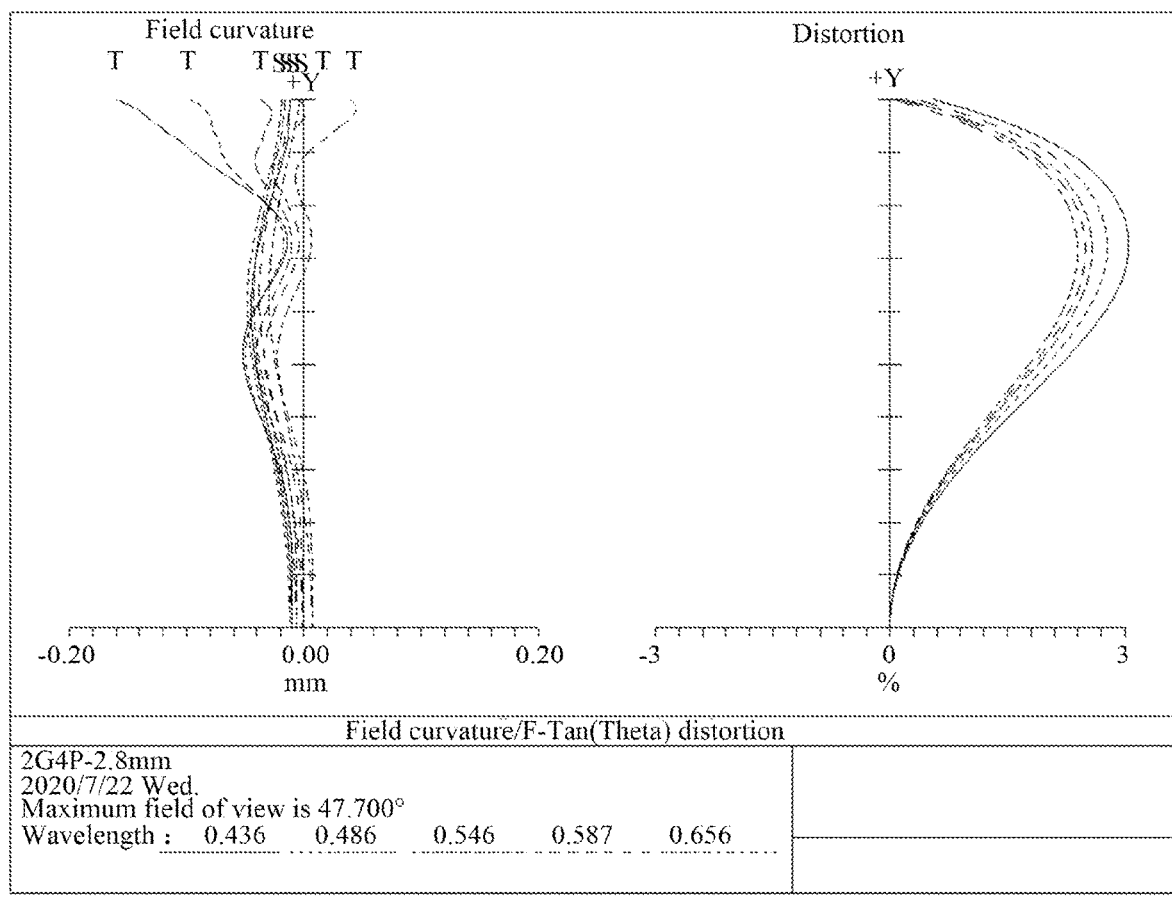
FIG. 13 are field curvature and distortion plots of a wide-angle lens according to Embodiment two of the present disclosure.
Figure 14:
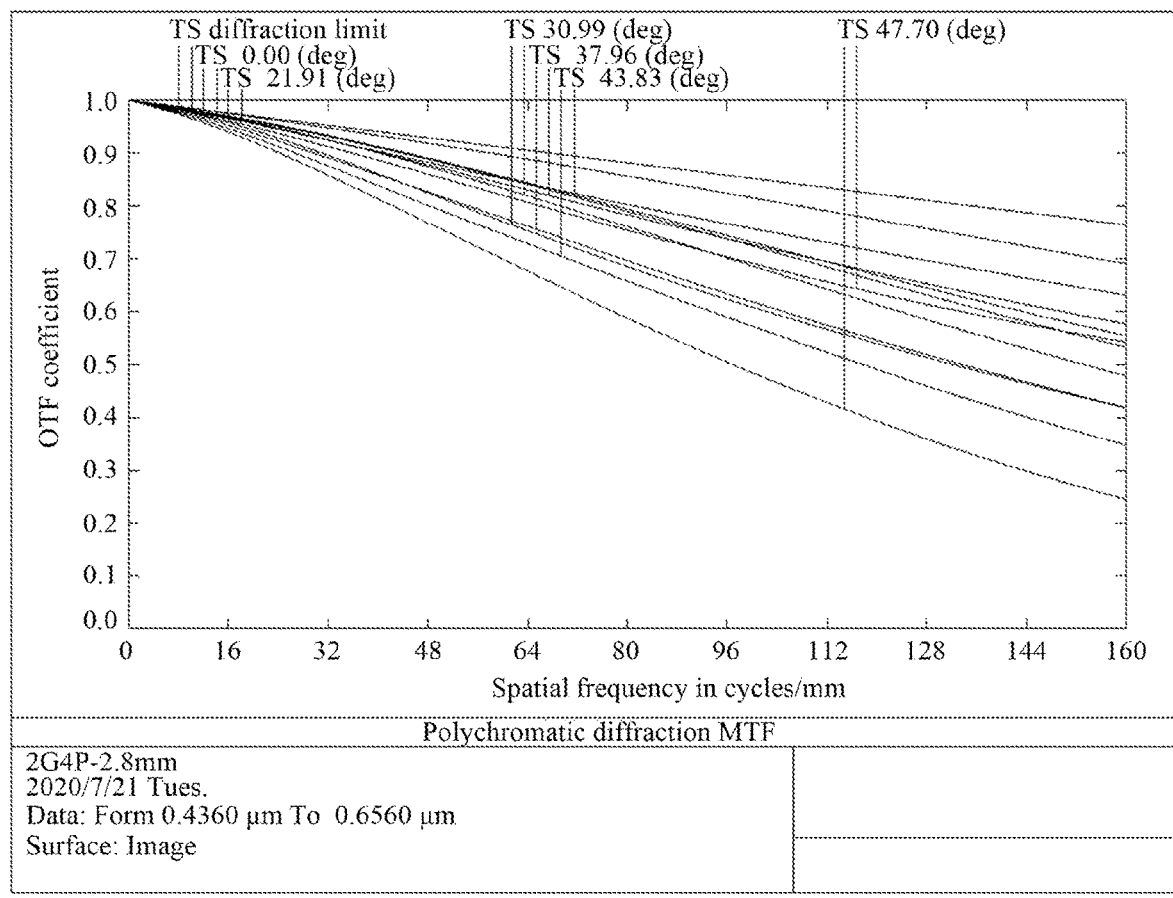
FIG. 14 is an MTF chart of a wide-angle lens according to Embodiment two of the present disclosure.

FIG. 12 is a longitudinal chromatic aberration graph of a wide-angle lens according to Embodiment two of the present disclosure. FIG. 13 are field curvature and distortion plots of a wide-angle lens according to Embodiment two of the present disclosure. FIG. 14 is an MTF chart of a wide-angle lens according to Embodiment two of the present disclosure. As shown in FIGS. 12, 13, and 14, the longitudinal chromatic aberration of the wide-angle lens provided by the embodiments of the present disclosure is small; the field curvature is small, that is, when imaging, the difference between the image quality of the center and the image quality of the periphery is small; and the image quality is high so that 4K high-definition image quality can be achieved.

To sum up, the wide-angle lens provided by the embodiments of the present disclosure realizes a wide-angle prime lens of low cost, ultra-high definition, ultra-low distortion, and no obvious purple edge. The design adopts a 7-piece structure, which can realize the 4K high-definition image quality while ensuring low cost and achieves that the optical distortion is below 3% and the field angle satisfies a range from 80° to 100°. The glass-plastic mixed structure adopted for the seven lenses enables the wide-angle lens to satisfy the requirement of no focus-shift error at −20° C. to 60.

It is to be noted that the above are merely preferred embodiments of the present disclosure and the principles used therein. It is to be understood by those skilled in the art that the present disclosure is not limited to the preceding embodiments. Those skilled in the art can make various apparent modifications, adaptations and substitutions without departing from the scope of the present disclosure. Therefore, while the present disclosure has been described in detail through the preceding embodiments, the present disclosure is not limited to the preceding embodiments and may include other equivalent embodiments without departing from the concept of the present disclosure. The scope of the present disclosure is determined by the scope of the appended claims.

What is claimed is:

1. A wide-angle lens, comprising: a first lens, a second lens, a third lens, a fourth lens, a fifth lens, a sixth lens, and a seventh lens which are arranged sequentially from an object surface to an image surface along an optic axis;

wherein the first lens and the sixth lens are negative focal power lenses, the third lens, the fourth lens, the fifth lens, and the seventh lens are positive focal power lenses, and the second lens is a negative focal power lens;

wherein the third lens is a glass spherical lens, and the first lens, the second lens, the fourth lens, the fifth lens, the sixth lens, and the seventh lens are all plastic aspheric lenses; the wide-angle lens further comprises a first stop disposed in an optical path between the fourth lens and the fifth lens; and wherein a focal length of the first lens is f1, a focal length of the second lens is f2, a focal length of the third lens is f3, a focal length of the fourth lens is f4, a focal length of the fifth lens is f5, a focal length of the sixth lens is f6, a focal length of the seventh lens is f7, and a focal length of the wide-angle lens is f, satisfying: $0.3 \le |f1/f| \le 2.6$, $|f2/f| \ge 2$, $2.3 \le |f3/f| \le 7.2$, $|f4/f| \ge 0.8$, $0.67 \le |f5/f| \le 2.94$, $0.32 \le |f6/f| \le 2.77$, and $|f7/f| \ge 0.16$.

2. The wide-angle lens according to claim 1, wherein the first lens has a refractive index of n1; the second lens has a refractive index of n2 and an Abbe number of v2; the third lens has a refractive index of n3 and an Abbe number of v3; the fourth lens has a refractive index of n4 and an Abbe number of v4; and the seventh lens has a refractive index of n7, satisfying:

$1.43 \le n1 \le 1.9$, $1.50 \le n2 \le 1.75$, $19 \le v2 \le 56$, $n3 \ge 1.43$, $v3 \ge 18.6$, $1.53 \le n4 \le 1.68$, $v4 \ge 19$, and $1.53 \le n7 \le 1.67$.

3. The wide-angle lens according to claim 1, wherein a sag of an object-side surface of the first lens is SAG11, and a sag of an image-side surface of the first lens is SAG12, satisfying: $0.08 \le |SAG11/SAG12| \le 1.5$.

4. The wide-angle lens according to claim 1, wherein a curvature radius of an object-side surface of the second lens is R21, satisfying: $|R21| \ge 1.42$.

5. The wide-angle lens according to claim 1, wherein a central thickness of the fourth lens is CT4, and a central thickness of the fifth lens is CT5, satisfying: $|CT4/CT5| \le 1.88$.

6. The wide-angle lens according to claim 1, wherein a curvature radius of an object-side surface of the fifth lens is R51, and a curvature radius of an image-side surface of the fifth lens is R52, satisfying: $|R51/R52| \ge 2.23$.

7. The wide-angle lens according to claim 1, wherein the fourth lens is a meniscus lens.

8. The wide-angle lens according to claim 1, wherein a distance from an optic axis center of an image-side surface of the seventh lens to the image surface is BFL, and a distance from an optic axis center of an object-side surface of the first lens to the image surface is TTL, satisfying: $0.11 \le BFL/TTL \le 0.89$.

9. The wide-angle lens according to claim 1, wherein the wide-angle lens has an aperture of F, satisfying: $0.6 \le f/F \le 2.8$.

\* \* \* \* \*